March 15, 1960 G. WAHLSTROM 2,929,055

ENCODERS

Filed July 21, 1953 2 Sheets-Sheet 1

INVENTOR
Gunnar Wahlstrom.

BY
Robert W. Hampton

INVENTOR
Gunnar Wahlstrom.
BY
Robert W. Hampton 2,929,055

Patented Mar. 15, 1960

2,929,055

ENCODERS

Gunnar Wahlstrom, Berkeley, Calif., assignor to Marchant Research, Inc., a corporation of California Application July 21, 1953, Serial No. 369,477

2 Claims. (Cl. 340—347)

The present invention concerns encoding devices and more particularly concerns analog-to-digital encoding devices for use with electronic digital computers.

It is often desirable to translate an analog quantity represented, for example, as a shaft position or a voltage level, into the equivalent digital representation of the same quantity. Each digital representation may be employed as a value input to a computer. If the analog information is to be fed into an electronic digital computer, it is convenient that it be translated into a series of voltage pulses representing each input quantity in the binary system.

It is therefore a principal object of the present invention to provide improved means for encoding analog quantities into equivalent digital quantities.

It is a more particular object to control the frequency of a signal generator in response to a shaft position.

Other objects of the invention are:

To control the frequency of a signal generator in response to a voltage level.

To count the cycles in the output signal of a variable-frequency signal generator during a fixed time interval.

The underlying principle of the present invention is therefore the variation of the frequency of a signal generator in response to a varying analog value input, and the translation of the signal generator output into a digital equivalent of the analog value.

Other objects and principles will appear from the following description, reference being made to the drawings in which.

FIRST EMBODIMENT

*General description*

To translate the rotated position of a shaft into a digital value representing the shaft position, the present circuit provides an oscillator having a tunable element mechanically linked to the shaft, so that the oscillator produces and output, or counting, signal having a frequency that continuously represents the shaft position. The output signal from the oscillator is appropriately shaped and is gated for a predetermined interval of time into a shifting counter which counts the number of signals produced by the oscillator during the predetermined time interval. The value standing in the counter at the end of the time interval is therefore a digital representation of the average shaft position during the interval and may be shifted into an appropriate register or other computer element for mathematical operations.

*Pulse generator and gate*

Figure 1:
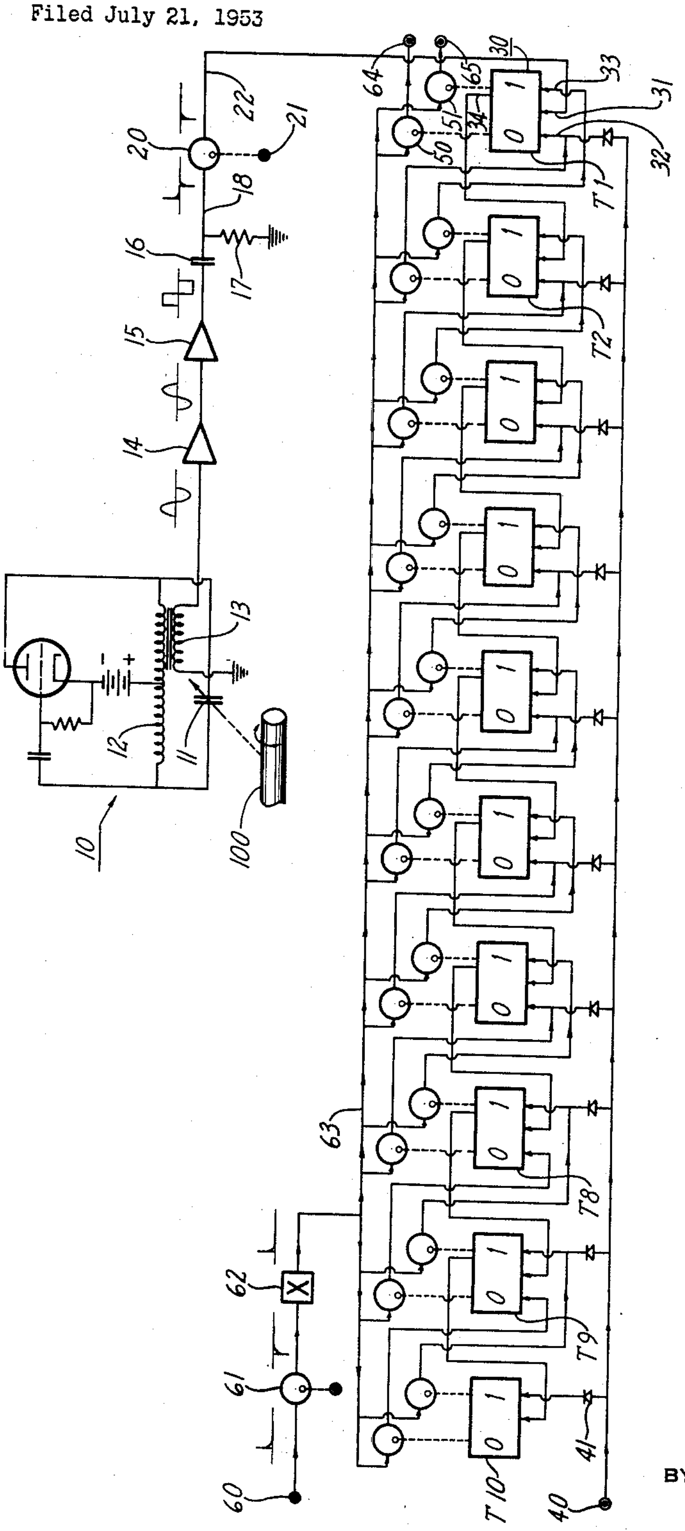
Fig. 1 is a block diagram of a preferred embodiment of the invention.
Figure 2:
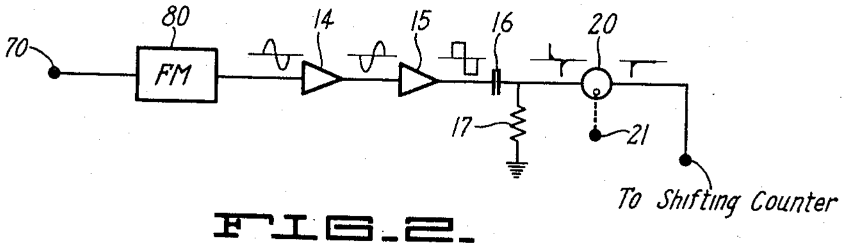
Fig. 2 is a block diagram of a second embodiment of the invention.

Referring to Fig. 1, the first embodiment includes an oscillator 10, shown by way of illustration as the well-known self-biased Hartley oscillator with a series plate feed. The oscillator has a tank circuit comprising a capacitor 11 and a coil 12 and produces a sinusoidal signal in the tank circuit. The capacitor 11 is variable and is mechanically linked to a rotatable shaft 100, so that as shaft 100 rotates, the capacitance of capacitor 11 is changed and in turn changes the frequency of the signal produced by the oscillator. A part of coil 12 constitutes the primary winding of an output transformer, the secondary winding 13 of which is connected to a first amplifier unit 14. Amplifier unit 14 is an ordinary class A amplifier such, for example, as shown in Fig. 2.14, page 46, of Elmore and Sands, "Electronics," National Nuclear Energy Series, Division V, volume 1, McGraw-Hill, New York, 1949. The output from oscillator 10 is amplified by unit 14 and is employed to overdrive a second amplifier unit 15 to produce a square wave signal. Amplifier unit 15 may be similar to amplifier unit 14 with circuit constants chosen to provide the necessary clipping. The square wave signal is differentiated by a network comprising a series capacitor 16 and a shunt resistor 17, thereby producing sharp positive-going and negative-going pulses, a shown in Fig. 1, which are employed to interrogate a gate 20 through a lead 18.

Gate 20 may be any of several well-known types of gates having a single control, such as 21, for arming the gate to pass or amplify pulses. An example of such a gate is shown in Figs. 4–1*a*, page 37, of "High-Speed Computing devices," first edition, McGraw-Hill, New York, 1950. Input A of this reference may be applicant's arming control terminal 21 while input B may be the signal input terminal. The arming control terminal 21 of gate 20 is connected to an appropriate unit within the main computer body and receives potentials which arm the gate during a predetermined base interval of time. An arrangement which may be used to develop the gate arming potential is described hereinafter. During the base interval in which gate 20 is armed, the positive-going pulses on lead 18 are passed by the gate to an output lead 22. Each such pulse is inverted by the gate and appears on lead 22 as a negative-going pulse. The negative-going pulses on lead 18 are not amplified by gate 20, so that only one pulse is passed by gate 20 for each cycle of operation of oscillator 10.

*Shifting counter, in general*

The shifting counter of the present circuit performs two functions, viz: (1) it receives and counts the pulses passed through gate 20 during the base interval; and (2) after such counting is completed, it shifts the manifested count out of the counter and into an appropriate receiving register within the computer.

*Counting*

The shifting counter comprises a series of bi-stable stages such, for example, as vacuum tube trigger circuits. Each stage has two stable conditions of operation representing the binary digits 0 and 1, respectively. The stages are connected in cascade so that two operations of one stage cause a single operation of the next succeeding stage, an operation of a stage being the reversal of that stage from one stable state of operation to the other. Each stage of the counter represents a denominational order in the binary system of numeration. Pulses are applied to the counter stage representing the binary order of least significance and cause the series of stages to operate in binary progression so that the collective 0 or 1 conditions of the series of stages at a given time constitutes a binary representation of the number of pulses applied to the circuit.

In Fig. 1, each trigger circuit stage is represented by a rectangle 30 having three input leads shown as arrows entering the bottom of the rectangle. The input lead 31 at the center of the rectangle is a "symmetrical" lead through which an applied pulse invariably reverses the condition of operation of the trigger circuit. The left-hand input lead 32 is a "reset" lead through which an applied pulse invariably resets the trigger circuit to 0, while the righthand input lead 33 is a "set" lead through which an applied impulse invariably sets the trigger circuit to 1. The cascade coupling interconnecting the progressive stages comprises an output lead 34 from the righthand section of each trigger circuit which is connected to the symmetrical input lead 31 of the next succeeding stage. The illustrated trigger circuits and their input leads and cascade coupling connections are fully described in the copending application Serial No. 340,983, filed March 9, 1953, now Patent No. 2,771,551 of Robert W. Hampton.

The present shifting counter comprises ten cascaded trigger circuit stages which have a counting capacity of the binary equivalent of 1,023 and return to their initial condition in response to each cyclic count of 1,024. These stages receive and count the pulses which are passed through gate 20 during the base time interval. Oscillator 10 has a finite frequency which corresponds to the zero position of shaft 100; therefore it is obvious that some definite reference number of pulses will pass through gate 20 and be counted even when the value zero is represented. Accordingly, the counting stages are initially preset to a value which equals 1,024 minus the reference number. It will be assumed for purposes of illustration that the reference number is 128, so that the counting stages are preset to the binary equivalent of 1,024−128=896, that is, the seven lowest stages are preset to 0 and the three highest stages are preset to 1, representing 128+256+512=896. Thus, the first 128 pulses which pass through gate 20 during the base time interval simply advance the counting stages to a zero setting, and the remaining pulses further advance the counter to a value setting which corresponds to the value represented by the rotated position of shaft 100. In other words, the oscillator 10 operates at its lowest frequency when the plates of capacitor 11 are fully meshed to give the maximum capacity. This fully meshed position of the capacitor corresponds to the zero position of the shaft 100. At this zero position, with the capacitor 11 at maximum capacity, 128 pulses pass to the counter during a base time interval and the count in the counter advances just to zero. At any intermediate position of shaft 100, the plates of capacitor 11 are less than fully meshed; the capacity is therefore lower and the frequency of oscillation is higher. Consequently, the pulses to the counter under these conditions advance the counter through zero to a count representative of the shaft position. At the maximum position of shaft 100 the plates of capacitor 11 are fully unmeshed; the capacity is therefore at its minimum and the frequency of oscillation is at its highest. In this case the maximum number of pulses are passed to the counter input during a base time interval. This maximum number of pulses must be less than or equal to 1152 which is 128, the number of pulses required to advance the counter from its preset value to zero, plus 1,024, the capacity of the counter. If shaft 100 is in motion during a given base time interval the count registered in the counter during this interval is representative of the mean shaft position during this interval. Therefore, if the base time interval is small compared to the rate of change of position of the shaft the registered count is substantially representative of the instantaneous position of the shaft. However, it is contemplated that for most applications it is the digital representation of a static shaft position which is desired.

The counter is preset by applying a pulse to a preset terminal 40 which is connected to the appropriate set or reset input lead of each stage through a respective decoupling diode such as 41. That is, the diodes 41 are connected to the set inputs of stages T8, T9 and T10 and to the reset inputs of the seven lower stages of the counter. Thus a preset pulse on terminal 40 sets the three highest stages to 1 and the seven lower stages to 0. Generally a control pulse from the associated computer may be utilized for the preset pulse; however, a control arrangement from which a preset pulse may be derived is described hereinafter.

*Shifting*

When a number of pulses have been counted into the present circuit, in the manner described above, the count manifestation may be shifted into an appropriate receiving register in the main computer body. For this purpose, the present counting stages are also adapted to constitute a shifting register. Each stage controls two shifting gates 50 and 51 (Fig. 1), one such gate being armed when the related stage is in its 0 condition and the other being armed when the same stage is in its 1 condition. Gates 50 and 51 are of the same type as gate 20.

A series of ten shift pulses are applied to all of the shifting gates in parallel and each shift pulse is amplified and passed by each armed gate which it interrogates. The output of each 0 gate 50 is connected to the reset input lead of the stage of next lower significance, while the output of each 1 gate 51 is connected to the set input lead of the stage of next lower significance. Therefore, in response to each shift pulse, each stage is set or reset in accordance with the previous standing of the next higher stage. A respective output from the 0 gate and the 1 gate of the stage of least significance may be connected to the input of an appropriate shifting register (not shown) in the main computer body, so that the latter register receives the digital information shifted out of the present shifting counter.

In Fig. 1, each trigger circuit stage T1 to T10 is shown as controlling a 0 gate 50 and a 1 gate 51, the control connections being shown by broken lines. When a given stage is in its 0 condition, its related 0 gate 50 is armed, whereas the related 1 gate 51 is armed when the same trigger circuit is in its 1 condition. Shift pulses, which may be taken from the main computer clock pulse generator, are applied through a terminal 60 and interrogate a gate 61 which is of the same type as gate 20. Gate 61 is armed by control voltages from an appropriate element within the main computer body, for example, a multivibrator which is properly synchronized by the computer clock pulses. After gate 20 is closed to the passage of pulses from oscillator 10, gate 61 is armed for a period of time necessary to pass ten shift pulses. The shift pulses which are applied to gate 61 are positive-going but are inverted in being amplified by gate 61.

Since it is desirable to employ positive-going pulses for interrogating the gates of the present type, the output pulses from gate 61 are fed through a pulse transformer 62 where they are inverted. These pulses are then fed to a shift buss 63 which applies each shift pulse to the interrogation inputs of all the 0 and 1 gates associated with the ten shifting counter stages. Through the application of ten shift pulses, the information standing in the ten stages is completely shifted into the receiving register in the main body of the computer through a pair of output terminals 64 and 65 form the 0 gate 50 and the 1 gate 51 of the least significant stage of the present circuit.

The control arrangement for providing the above-described gate arming potentials to gates 20 and 61 and for providing the preset pulses to terminal 40 may take a variety of forms. It may, for example, comprise one or more multivibrator circuits an example of which is shown in Fig. 2.30, page 82, Elmore and Sands, "Electronics," National Nuclear Energy series, Division V, volume 1, McGraw-Hill, New York, 1949. Such a multivibrator may be used as a relaxation oscillator to provide rectangular output waveforms suitable for gate arming potentials. As shown by Elmore and Sands (Fig. 2.30), the multivibrator comprises a pair of triodes T–1 and T–2 which alternately conduct at a frequency determined primarily by grid resistors R1 and the cross coupling capacitors C1. As pointed out at page 83 of Elmore and Sands, the multivibrator may be synchronized with a primary periodic-voltage source whose frequency is a multiple of the natural frequency of the multivibrator. Thus for present purposes, the multivibrator may be synchronized with the computer clock pulses on terminal 60 and by proper choice of the components of the multivibrator circuit the multivibrator will reverse its state of operation upon the occurrence of every *n*th clock pulse, where *n* may be as great as 10. If a greater dividing ratio is needed several multivibrator stages may be cascaded. Also, the multivibrator may be operated in an asymmetrical manner; i.e., the period in one state may be as great as 10 times the period in the other state. It will be recalled that gate 20 (Fig. 1) is armed for a predetermined base time period to admit the pulse train to be counted after which gate 61 is armed to shift out the count. A preset pulse to terminal 40 then prepares the circuit for new cycle of operation. An example of how a single multivibrator may be connected to control the translator circuit throughout each cycle of operation will now be described. Referring both to the present Fig. 1 and to Fig. 2.30 of Elmore and Sands the arming terminal 21 of gate 20 may be connected to the plate of tube T–1 of the multivibrator and the arming terminal of gate 61 may be connected to the plate of tube T–2. It is then evident that when tube T–1 is not conducting the voltage at its plate is relatively high and therefore gate 20 is armed and pulses are passed by gate 20 to the counter. At the same time, tube T–2 is conducting and the voltage at its plate is relatively low; consequently, gate 61 is not armed. It is further evident that a change of state of the multivibrator disarms gate 20 and arms gate 61. This, of course, cuts off the pulses to the input to the counter and passes the clock pulses on terminal 60 to shift out the count. A preset pulse is now required subsequent to the disarming of gate 61 and prior to the arming of gate 20 at the beginning of the next cycle. This preset pulse is obtained merely by capacitively coupling the plate of tube T–1 of the multivibrator to the preset terminal 40. Thus, when the multivibrator changes state to begin a new count cycle the voltage rise at the plate of T–1 is differentiated by the capacitive coupling in well-known manner to apply a preset pulse to the counter stages. The above example is merely one of many possible arrangements for controlling the translator circuit. As a practical matter, the specific embodiment of the timing circuit will depend on the nature of the computer with which the translator is used. In many instances suitable gate arming potentials will be available without structure additional to that illustrated.

*Summary of first embodiment*

Analog information is represented by the rotated position of shaft 100. By a mechanical linkage, this shaft controls the position of the tunable element in the tank circuit of oscillator 10. The oscillator produces an output signal, the frequency of which is determined by the rotated position of shaft 100. The output signal from oscillator 10 is shaped to form positive-going pulses to interrogate a timing gate 20 which is armed during a base time interval to amplify and pass a number of pulses determined by the output frequency of oscillator 10. The output from gate 20 is fed through the shifting counter which first counts the number of pulses that it receives during the base time interval and then shifts the manifested count into a receiving register in the main computer body. The shifting counter is preset to the complemental value corresponding to the reference frequency of oscillator 10 which, in turn, corresponds to the zero value position of shaft 100. Therefore, if shaft 100 is set to its zero position, the number of counting pulses which are passed by gate 20 during the base time interval advances the shifting counter to exactly a zero count, whereas if the shaft 100 is set to some position representing a value larger than zero, then the number of pulses which pass through gate 20 advance the shifting counter through zero to a count representing the position of shaft 100.

It should be noted that the present circuit is capable of receiving analog input values in terms of shaft positions and translating these values into digital values which bear any of a number of relationships to the input values. The tunable capacitor 11 in the tank circuit of oscillator 10 may be shaped as desired to vary the oscillator frequency linearly, exponentially, or otherwise in relationship to the input values.

SECOND EMBODIMENT

The second embodiment of the present invention comprises means for converting a slowly changing D.C. analog input voltage into a digital representation of a numerical value corresponding to the instantaneous level of the D.C. input voltage.

The present circuit includes a frequency modulator which receives the D.C. input voltage and translates that voltage into an A.C. signal having a frequency which is a function of the instantaneous D.C. voltage level. The A.C. signal is amplified and shaped to form counting pulses and is then gated into a preset shifting counter.

Referring to Fig. 2, a slowly changing voltage representing an analog quantity is received at a terminal 70 and is fed into a frequency modulator unit 80 which may for example be of the type shown in Fig. 9–43 on page 332 of Reich, "Theory and Application of Electron Tubes," 2nd ed., McGraw-Hill, N.Y. (1944). The frequency modulator unit produces an alternating current signal having a frequency that is controlled by the voltage level of the D.C. input. This unit is fully described in the above-named publication. The A.C. output from the frequency modulator 80 is amplified and shaped into counting pulses and is then gated and fed into a preset shifting counter in the manner described in relation to Fig. 1.

THIRD EMBODIMENT

The third embodiment of the present invention comprises a frequency modulator unit for receiving an analog D.C. voltage, a fixed-frequency oscillator for generating a reference signal, and a mixer unit for combining the reference signal and the frequency modulator signal to produce a signal having a frequency equal to the difference between the frequencies of the two input signals. The mixer output is filtered to eliminate all frequencies except the difference frequency. The resulting signal is shaped and gated, in the manner previously described, and is fed to a shifting counter which is preset to a zero count. The number of counting pulses which are counted by the shifting counter during the base time interval is therefore a function of the difference frequency from the mixer unit, and in turn is a function of the voltage level of the D.C. input to the frequency modulator.

Figure 3:
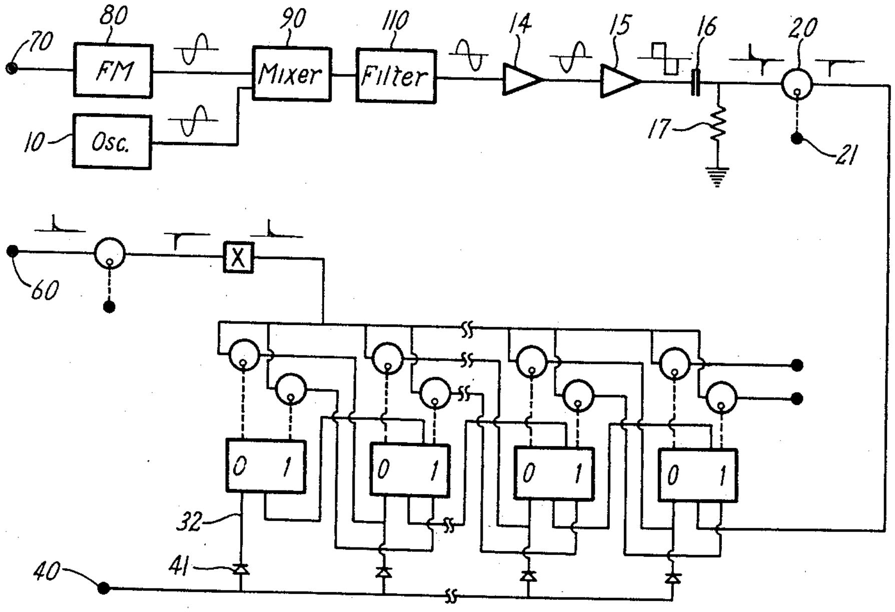
Fig. 3 is a block diagram of a third embodiment of the invention.

Referring to Fig. 3, the D.C. analog voltage is applied through terminal 70 to a frequency modulator 80 which produces a sinusoidal signal as in the second embodiment. An oscillator 10, which may be of the type shown in Fig. 1, produces a signal having a constant frequency equal to the base frequency of unit 80. In other words, when a D.C. voltage representing the value zero is applied to unit 80, the signals from units 10 and 80 have the same frequency. The signals from units 10 and 80 are combined in a mixer 90 which may, for example, be a pentode with a suppressor grid input from unit 10 and a control grid input from unit 80. The mixer output comprises four frequencies, the signal from unit 80, the signal from unit 10, their sum, and their difference. All of these frequencies except the difference frequency are substantially eliminated by a low-pass filter 110 connected to the output of the mixer 90. The filtered signal is shaped and is then gated to a shifting counter in the manner hereinbefore described.

In the present circuit, since there is no difference between the frequencies from units 10 and 80 when the D.C. input at terminal 70 represents zero, there are no pulses passed through gate 20 during the base time interval in such case. Therefore, the shifting counter is preset to the value zero, this being the reference value in the present embodiment. For presetting, the preset terminal 40 is connected through the decoupling diodes 41 to the reset input lead 32 of each stage. In all other respects, the shifting counter in the present embodiment is identical to that previously described.

I claim:

1. In a device of the class described, the combination of: a rotatable shaft having a plurality of rotated positions each representing a respective analog value; means for producing an alternating current counting signal, said means including an oscillator having a tank circuit, a capacitor constituting a tunable element in said tank circuit for controlling the frequency of said counting signal, means interconnecting the shaft and said capacitor for varying the frequency of the counting signal in response to variation of the rotated position of said shaft; a normally closed gate having an input section for receiving said counting signal and having a normally disabled output section for transmitting said signal; a counting circuit including a plurality of denominational counting stages for counting the cycles of a signal impressed thereon; means for presetting the counting circuit to a predetermined value; means for arming said gate during a predetermined base time interval to thereby enable said output section for impressing said counting signal on the counting circuit during the base time interval; and means for shifting the digital count in the direction of lower numerical significance.

2. In a device of a class described, the combination of: a rotatable shaft having a plurality of rotated positions each representing a respective analog value, a signal generator for producing an alternating current counting signal, a tunable element within said signal generator for varying the frequency of the counting signal, means for varying the setting of the tunable element in response to rotating movement of said shaft, a counting circuit including a plurality of denominational counting stages for counting the cycles of a signal impressed thereon, means for presetting the counting circuit to the predetermined value, and means for impressing said counting signal on the counting circuit for a predetermined interval of time.

References Cited in the file of this patent

UNITED STATES PATENTS

| | | |
|---|---|---|
| 1,849,870 | Fitzgerald | Mar. 15, 1932 |
| 2,416,849 | Schaefer | Mar. 4, 1947 |
| 2,420,509 | Whittaker | May 13, 1947 |
| 2,480,713 | Cherry | Aug. 30, 1949 |
| 2,494,327 | Beurtheret | Jan. 10, 1950 |
| 2,496,912 | Grosdoff | Feb. 7, 1950 |
| 2,520,125 | Clavier | Aug. 29, 1950 |
| 2,539,623 | Heising | Jan. 30, 1951 |
| 2,546,307 | Johnson et al. | Mar. 27, 1951 |
| 2,568,724 | Earp et al. | Sept. 25, 1951 |
| 2,585,630 | Crosman | Feb. 12, 1952 |
| 2,616,965 | Hoeppner | Nov. 4, 1952 |
| 2,619,282 | Manley | Nov. 25, 1952 |
| 2,634,052 | Bloch | Apr. 7, 1953 |
| 2,669,388 | Fox | Feb. 16, 1954 |
| 2,680,241 | Gridley | June 1, 1954 |
| 2,769,595 | Bugley | Nov. 6, 1956 |

FOREIGN PATENTS

| | | |
|---|---|---|
| 314,494 | Great Britain | Sept. 19, 1930 |

OTHER REFERENCES

Burke: A Survey of Analog-to-Digital Converters, published in the Proceedings of the I.R.E., October 1953 (vol. 41, No. 10) (pages 1455 to 1461, page 1459 relied on. Presented Dec. 12, 1952).